(12) United States Patent
Trumpp et al.

(10) Patent No.: US 8,061,541 B2
(45) Date of Patent: Nov. 22, 2011

(54) BLOW MOLDED CAMOUFLAGE BOTTLE

(75) Inventors: Tobias Christian Trumpp, Milford, CT (US); Brett Christopher Domoy, Brookfield, CT (US); Julie Kathryn Zaniewski, Sandy Hook, CT (US)

(73) Assignee: Conopco, Inc., Englewood Cliffs, NJ (US)

( * ) Notice: Subject to any disclaimer, the term of this patent is extended or adjusted under 35 U.S.C. 154(b) by 1041 days.

(21) Appl. No.: 11/940,393

(22) Filed: Nov. 15, 2007

(65) Prior Publication Data

US 2009/0127222 A1 May 21, 2009

(51) Int. Cl.
*B65D 23/08* (2006.01)
(52) U.S. Cl. .................. 215/13.1; 220/592.17
(58) Field of Classification Search .............. 215/12.2, 215/13.1; 220/592.1, 592.17, 902; 428/17
See application file for complete search history.

(56) References Cited

U.S. PATENT DOCUMENTS

| | | | | |
|---|---|---|---|---|
| 3,032,224 A | * | 5/1962 | Lou | 215/12.2 |
| 3,069,041 A | * | 12/1962 | Musso et al. | 220/592.16 |
| 3,096,897 A | * | 7/1963 | Hansen | 215/12.2 |
| 3,221,954 A | | 12/1965 | Lux | |
| 3,967,993 A | * | 7/1976 | Isomi | 156/86 |
| 5,350,776 A | | 9/1994 | Raad | |
| 5,819,991 A | | 10/1998 | Kohn et al. | |
| 5,901,882 A | * | 5/1999 | Siegel | 222/131 |
| 6,033,608 A | * | 3/2000 | Reynolds et al. | 264/54 |
| 6,119,889 A | * | 9/2000 | Fujii et al. | 220/592.27 |
| 6,467,644 B1 | * | 10/2002 | Yeh | 220/592.17 |
| 7,270,244 B1 | * | 9/2007 | Liu | 215/13.1 |
| 2002/0027137 A1 | * | 3/2002 | Price et al. | 220/23.87 |
| 2003/0092341 A1 | * | 5/2003 | Curtis et al. | 442/327 |
| 2004/0144746 A1 | | 7/2004 | Tanaka et al. | |
| 2005/0053732 A1 | * | 3/2005 | Tilby | 428/17 |
| 2005/0257308 A1 | | 11/2005 | Willis | |
| 2008/0047967 A1 | * | 2/2008 | Brunner et al. | 220/737 |

FOREIGN PATENT DOCUMENTS

| | | |
|---|---|---|
| DE | 195 11 611 A1 | 3/1995 |
| EP | 1 655 326 A1 | 11/2004 |
| FR | 1 455 387 | 9/1965 |
| WO | 2009/062838 A1 | 5/2009 |

OTHER PUBLICATIONS

International Search Report PCT/EP2008/064541.

* cited by examiner

*Primary Examiner* — Sue Weaver
(74) *Attorney, Agent, or Firm* — Milton L. Honig

(57) ABSTRACT

A bottle is provided with a visual camouflage appearance. Walls of the bottle include an outer first layer, a middle second layer and an optionally inner third layer. The first layer is transparent. The third layer can include a contrast coloring agent. The second layer includes foamed unevenly distributed regions arranged to create a camouflage appearance.

9 Claims, 1 Drawing Sheet

BLOW MOLDED CAMOUFLAGE BOTTLE

BACKGROUND OF THE INVENTION

1. Field of the Invention

The invention relates to a bottle displaying a camouflage pattern visible on an outer surface, and a process for manufacture.

2. The Related Art

Camouflage, and articles having a camouflage pattern, are ordinarily used for purposes of concealment. Hunters wear camouflage clothing to conceal themselves from their quarry. Military uses are concerned with concealing personnel and equipment from enemy forces. Colors of the patterns are designed to blend into the environment. For instance, camouflage materials have been developed that mimic the colors and patterns found in forests, fields, marshes, and deserts. Typically, these materials use earth tone colors to blend in with the environmental surroundings. Perhaps the most familiar is the traditional woodland camouflage pattern. It is irregular, random appearing areas or blotches of different sizes and different colors. Typically it has at least four colors, including shades of tan, brown, green (olive drab) and black. More modern, nontraditional camouflage patterns for hunters have also been developed. These have complex three-dimensional representations of various outdoor settings, such as a forest, marsh, corn field, tree bark, wetlands, etc.

Some people are drawn toward articles with a camouflage pattern. These products bring association to their hunting or military experiences and aspirations. Young male adults can particularly be attracted to this kind of design in some way manifesting their fantasies of adventure.

Ordinarily camouflage designs are achieved by painting an outer surface of an article. Alternatively, a label or shrink wrap packaging can be used to apply the design. All these have the shortcoming of a two-dimensional aspect. Much more vivid would be a three-dimensional rendition.

U.S. Pat. No. 5,350,776 (Raad) reports a foamed elastomeric polymer with a camouflage appearance on its surface and throughout its mass. This design is characterized by distinct, randomly sized regions of various colors having curved non-angular borders with substantially no blend of colors. It is also said to be free from gas pockets and blisters. A deficiency of this technology is that it is limited to a material that is foamed throughout the article. This means that even outer surfaces are formed of foamed material. The resultant drawbacks include non-smooth surfaces likely permeable to liquids. Manufacture has the disadvantage of requiring a tedious multi-step process involving compounding, cutting compounded batches, and curing steps.

Accordingly, the present invention seeks to overcome many of the known problems. In particular, there is sought a three-dimensional rendition of a camouflage pattern within walls of a plastic bottle. Moreover, the bottle needs a non-permeable smooth outer surface not achievable by fully foamed plastics.

SUMMARY OF THE INVENTION

A bottle is provided which includes a wall formed with an outermost first non-foamed transparent layer and underneath a second layer of unevenly distributed foamed regions creating a camouflage appearance.

More particularly there is provided a bottle having a cavity for receiving a product and a wall which includes:

a first layer outermost from the cavity which is transparent, formed of a non-foamed resin and having a smooth outer surface;

a second layer including a foamed resin having a color imparted by a pattern coloring agent; and a third layer inner to the first layer and closest to the cavity formed of a non-foamed resin of contrast color imparted by a contrast coloring agent differing from the color of the second layer, the second layer being arranged between the first and third layers.

Further, there is also provided a method for producing a bottle with a visual camouflage appearance being formed with an outermost first non-foamed transparent layer and underneath a second layer of unevenly distributed foamed regions creating a camouflage appearance, the method including:

(A) compounding a foaming additive and a pattern coloring agent into a resin to form a compounded resin;

(B) extruding the compounded resin with other resin to form a parison, the parison comprising:

a first layer of the bottle which is transparent and has a smooth outer surface;

a second layer which is the compounded resin having a color imparted by the pattern coloring agent; and a third layer formed of a non-foamed resin with contrast color imparted by a contrast coloring agent, the second layer being arranged between the first and third layers;

(C) delivering the parison into a blow molding device for producing the bottle; and (D) heating during extruding or molding the compounded resin to generate gas bubbles and thereby the camouflage appearance.

BRIEF DESCRIPTION OF THE DRAWING

Further advantages and features of the present invention will become more evident upon consideration of FIG. 1 representing a front elevational view of a bottle bearing a camouflage pattern of the invention, and FIG. 2 representing a partial cross-section of a wall of the bottle.

DETAILED DESCRIPTION OF THE INVENTION

Figure 1:
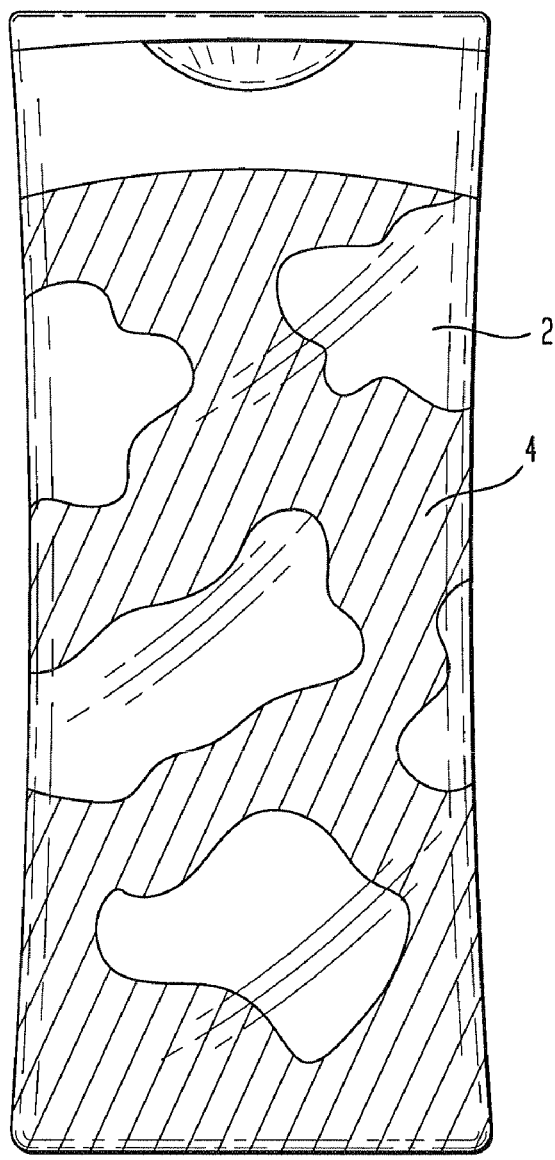

Now there has been achieved a three-dimensional camouflage pattern within a plastic bottle. The pattern is formed through a blow molding process wherein at least two but preferably at least three layers of plastic resin form the walls of the bottle. Only the second of the layers includes a foaming additive and can be considered the only one of the layers being a foamed layer.

The first layer is an outermost one relative to an interior of the bottle. This interior is a cavity for storing a variety of products, particularly flowable liquid compositions. An outer surface of the first layer is smooth, a result of resin being forced under pressure against an inner surface of the mold for the bottle. Advantageously the first layer is transparent. In most instances this first layer will possess no coloring agent so that any shade found in the first layer is purely of the native utilized resin. The term "transparent" connotes the ordinary dictionary meaning of being sufficiently clear to see through.

When present, the third layer is inner to the first layer and closest to the cavity. It is also a non-foamed layer. The second layer is arranged between the first and third layers. Visually the third layer will have a contrast color imparted by a contrast coloring agent. The contrast color is different from that visually exhibited by color of the second (foamed) layer, the latter color being imparted by a pattern coloring agent. Preferentially the pattern coloring agent will deliver a lighter color than that of the contrast coloring agent to their respective layers. For instance, appropriate combinations of light and dark coloring for the pattern and contrast coloring agents respectively are: tan-brown; khaki-dark brown; yellow-green; orange-dark brown; light green-dark brown; and olive-black to mention just a few non-limiting combinations. Preferably the pattern color will have shades ranging from light yellow to light brown. The contrast color preferably will have shades ranging from brown to black.

Resins suitable for the present invention are polyolefins which may include low density polyethylene, high density polyethylene, low density polypropylene, high density polypropylene and metallocene catalyzed polyolefin (i.e. plastomer) resins. The resins of the present invention may either be homopolymers or copolymers. Examples of the latter are olefin-copolymers such as polyethylene butylacrylate, polyethylene methacrylate and polyethylene vinylacetate. Walls of bottles according to the present invention generally will not be formed of cross-linked elastomeric polymers. Neither will the outer surface of articles produced in accordance with this invention be constructed of foamed polymer.

The second layer incorporates foaming additives. These will upon activation form bubbles of cell size which may range from about 0.05 to 2.0 mm, more preferably from about 0.1 to 0.6 mm. Particularly preferred are cells which are open. Normally walls of the bottle on the inner surface thereof (ordinarily equivalent to an inner surface of the third layer) will have a rough texture. The rough non-smooth surface results from open cell structures appearing on the surface. This effect is attributed to gas bubbles escaping inward through a central cavity of the mold (bottle). Control of average cell size is important to retain the camouflage appearance. When too large, the cells reveal the underneath third layer rather than presenting an irregular pattern of lightly shaded foamed second layer.

A variety of foaming additives may be utilized for incorporation into the second layer. Azo compounds, N'-nitroso compounds and sulfonyl hydrazide compounds are three particularly preferred types of foaming additives. Furthermore, mixtures of these groups of compounds may also be used herein. Among azo compounds, azodicarbonamide, azobisisobutyronitrile, and diazoaminobenzene are preferred foaming additives. Among the nitroso compounds, N,N'-dimethyl, N,N'-dinitrosoterephthalamide, and N,N'-dinitrosopentamethylenetetramine are preferred. Exemplary sulfonyl hydrazide foaming additives include: benzenesulfonyl hydrazide, toluene-(4)-sulfonyl hydrazide, benzene-1,3-disulfonylhydrazide, diphenylsulfon-3,3'-disulfonyl hydrazide, and 4,4'oxybis(benezenesulfonyl hydrazide). Mixtures of the foaming additives may also be used.

Amounts of foaming additive may range from about 1 to about 10%, preferably from about 2 to about 7%, more preferably from about 2.5 to about 4%, and optimally from about 2 to 3% by weight of the second layer.

Inorganic carbonates may also be suitable as constituents of foaming additives. Examples include sodium bicarbonate, sodium aluminum hydroxyl carbonate, magnesium carbonate and mixtures thereof. Polycarboxylic acids are also useful. These include citric acid, fumaric acid, tartaric acid, sodium hydrogen citrate and disodium citrate as well as mixtures of carbonates and acids.

Activators for the foaming additives are often included to assist foam generation. Suitable for this purpose are zinc oxide, dibasic lead phthalate, ethylene glycol and urea and derivatives thereof (e.g. hydroxyethyl urea). These activators may be formulated in amounts from about 0.1 to about 15%, preferably from about 0.5 to about 7%, optimally from about 1 to about 3% by weight of the foaming additive.

Relative weight ranges amongst the three layers are as follows. The first layer may range from about 30 to about 60%, preferably from about 40 to about 55% by weight of the combined layers. The second layer may range from about 25 to about 45%, preferably from about 30 to about 40% by weight of the combined layers. The third layer may range from about 5 to about 30%, preferably from about 10 to about 25% by weight of the combined layers. Usually the first layer will be the largest layer relative to the second and third layers. Usually the third layer will be the smallest by weight of the three layers. Relative ratio of the first to second layer may range from about 2:1 to about 1.05:1, preferably from about 1.8 to about 1.1 by weight. The second and third layers may range in relative amounts from about 3:1 to about 1.1:1, preferably from about 2.2:1 to 1.8:1 by weight respectively.

By the term "camouflage" is meant a pattern characterized by distinct, randomly sized regions of various colors, each region having non-angular borders. The regions will have one of either two colors with color changes occurring at interfaces of distinct colored regions.

Bottles of the present invention are created through a blow molding process. In extrusion blow molding, a molten tube of resin called a parison is extruded from a die into an open mold. The mold is closed around the parison, and the bottom of the parison is pinched together by the mold. Air under pressure is fed through the die into the parison, which expands to fill the mold. The formed bottle is then cooled as it is held under internal air pressure. Upon the mold being opened, the bottle can fall free.

Parisons of the invention can be formed from an extrusion procedure. Therein resins which will form walls of the bottle and the foaming additives and coloring agents are fed into an extruder apparatus preferably having three component streams. The three component streams create a three layer material flow. In accordance with hydraulic flow principles, the formed layers are injected to the cavities between the separate mold parts and then distributed. Intermittant feeding of the foaming additives to a resin stream of the second layer will create the uneven outlines of camouflage regions. The mold parts will be kept under pressure until the foaming additives have at least partially been activated to thereby create the desired bubble patterns. Parison and preform technology is known in the art from U.S. Pat. No. 4,824,618 (Strum et al.) and U.S. Pat. No. 5,674,448 (Slat et al.), both of which documents are herein incorporated by reference.

Figure 2:
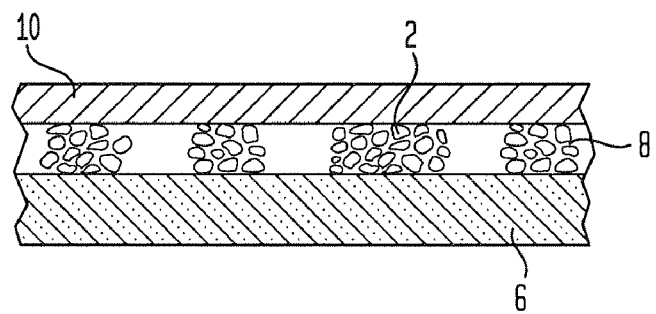

FIG. 1 illustrates a camouflage design within walls of a typical bottle. The design is formed by foamed regions 2 and unfoamed regions 4. In FIG. 2, the outermost first layer 6 is transparent and allows viewing of the foamed regions 2 created within a second layer 8. These foamed regions are of a light color. Other unfoamed regions 10 seen as dark areas are the third layer.

All documents referred to herein, including all patents, patent applications, and printed publications, are hereby incorporated by reference in their entirety in this disclosure.

The term "comprising" is meant not to be limiting to any subsequently stated elements but rather to encompass non-specified elements of major or minor functional importance. In other words the listed steps, elements or options need not be exhaustive. Whenever the words "including" or "having" are used, these terms are meant to be equivalent to "comprising" as defined above.

Except in the operating and comparative examples, or where otherwise explicitly indicated, all numbers in this description indicating amounts of material ought to be understood as modified by the word "about".

It should be noted that in specifying any range of concentration or amount, any particular upper concentration can be associated with any particular lower concentration or amount.

EXAMPLES

A series of extrusion blow molding trials were conducted to fine tune the "cloud" effect. Clouds were created by the uneven islands of bubbled foam distributed throughout the second layer visually representative of a camouflage design. Resins for use in the trials for all layers were high density polyethylene. Pattern coloring agent for the middle (second) layer was a yellow colorant. When present the contrast coloring agent for the inner (third) layer was a dark brown colorant. The foaming additive utilized was Hydrocerol PEX 5025 available from the Clariant Corporation. Further details and the resultant effect for the several trials are reported in the Table below.

| Trial | Inner (Third) Layer (Weight %) | Middle (Second) Layer (Weight %) | Outer (First) Layer (Weight %) | Hydrocerol PEX ® (Weight %) | Coloring Agent Inner Layer | Coloring Agent Middle Layer | Operating Pressure (bar) | Visual Effect |
|---|---|---|---|---|---|---|---|---|
| 1 | 36 | 52 | 12 | 1 | — | — | 1 to 8 | No cloud |
| 2 | 0 | >52 | >12 | 2.5 | — | — | 8 | Cloud Effect |
| 3 | >36 | >52 | >12 | 2.5 | — | — | 8 | Cloud at Edges |
| 4 | <36 | 52 | 12 | 1 | — | — | 8 | No Cloud |
| 5 | <36 | 52 | 12 | 4 | — | — | 8 | Cloud Effect |
| 6 | 15 | 36 | 49 | 4 | 2 | — | 8 | Cloud Effect |
| 7 | 15 | 36 | 49 | 4 | 2 | 1 | 8 | Cloud Effect |
| 8 | 12 | 39 | 49 | 4 | 2 | 1 | 8 | Cloud Effect |
| 9 | 15 | 36 | 49 | 4 | 2 | 10 | 8 | Cloud Effect |

Based on the series of conducted trials, it is evident that the cloud or camouflage effect is produced under a variety of conditions. Certain of the conditions favor the effect. For the particular foaming additive utilized in the trials, at least 2.5% by weight of the second (middle) layer seems to be required. Since the foam structure is open celled, first (outer) and third (inner) layers are helpful to prevent bubble leakage.

What is claimed is:

1. A bottle comprising:
   a wall formed with an outermost first non-foamed transparent layer;
   a second layer of unevenly distributed foamed resin having a color imparted by a pattern coloring agent, the foamed resin formed with bubbles of cell size ranging from about 0.05 to 2.0 mm; and
   a third layer inner to the first layer and closest to a cavity defining an interior space of the bottle and formed of a non-foamed resin of color contrast imparted by a contrast coloring agent different from the color of the second layer, the second layer being arranged between the first and third layers, the second and third layers in combination creating a camouflage appearance.

2. The bottle according to claim 1 wherein the outermost first non-foamed transparent layer has a smooth outer surface.

3. The bottle according to claim 1 wherein the pattern coloring agent ranges from light yellow to light brown in color.

4. The bottle according to claim 1 wherein the contrast coloring agent ranges from brown to black in color.

5. The bottle according to claim 1 wherein the first and second layers are formed of a polyethylene or a polypropylene resin.

6. The bottle according to claim 5 wherein the polyethylene resin is high density polyethylene.

7. The bottle according to claim 1 wherein the first and second layer are present in a ratio from about 2:1 to about 1.05:1 by weight.

8. The bottle according to claim 1 wherein the second and third layers are present in a ratio from about 3:1 to about 1.1:1 by weight.

9. The bottle according to claim 1 wherein the foamed resin of the second layer has bubbles of cell size ranging from about 0.1 to 0.6 mm.

* * * * *